United States Patent

Mochizuki et al.

Patent Number: 5,963,162
Date of Patent: Oct. 5, 1999

[54] OBJECT DETECTING SYSTEM

[75] Inventors: Kazuhiko Mochizuki; Hiroyuki Koike; Akira Iihoshi; Takashi Sugawara, all of Saitama, Japan

[73] Assignee: Honda Giken Kogyo Kabushiki Kaisha, Tokyo, Japan

[21] Appl. No.: 09/115,178

[22] Filed: Jul. 14, 1998

[30] Foreign Application Priority Data

Jul. 16, 1997 [JP] Japan ................................ 9-191008

[51] Int. Cl.$^6$ ........................... G01S 13/60; G01S 13/93
[52] U.S. Cl. ................................. 342/70; 342/109
[58] Field of Search ............................ 342/70, 71, 72, 342/106, 109, 114, 115, 118, 196, 111

[56] References Cited

U.S. PATENT DOCUMENTS 5,731,778   3/1998   Natatani et al. ................. 342/70

FOREIGN PATENT DOCUMENTS 408094749   4/1996   Japan.
8-94749     4/1996   Japan.

*Primary Examiner*—Daniel T. Pihulic
*Attorney, Agent, or Firm*—Nikaido Marmelstein Murray & Oram LLP

[57] ABSTRACT

An object detecting system detects an object using an FM-CW wave, so that even if either one of rising-side and falling-side peak frequencies is missing, a plurality of objects can be accurately recognized by accurately combining pluralities of rising-side and falling-side peak frequencies. When it is determined that either one of rising-side and falling-side peak frequencies is missing, the combination of the peak frequencies is determined by calculating the missing peak frequency based on a peak frequency which is not missing.

4 Claims, 6 Drawing Sheets

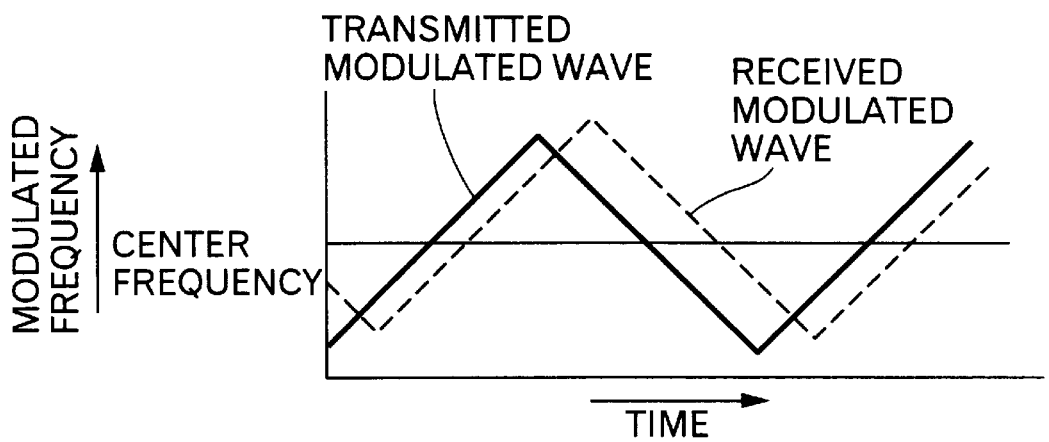
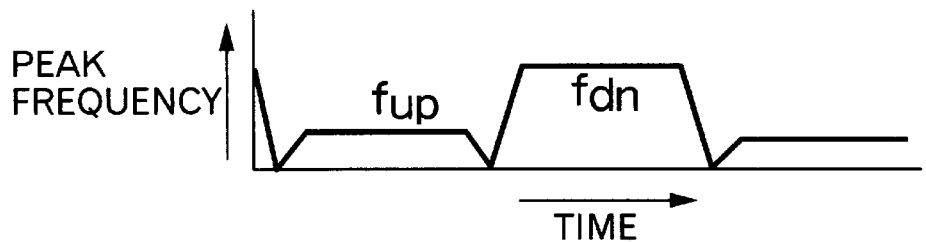
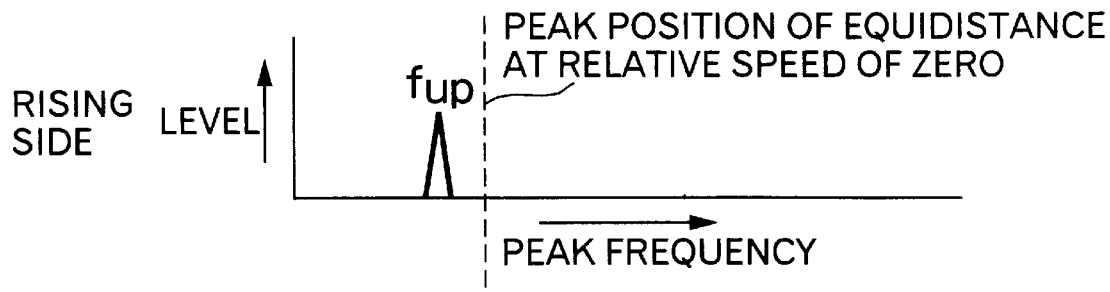
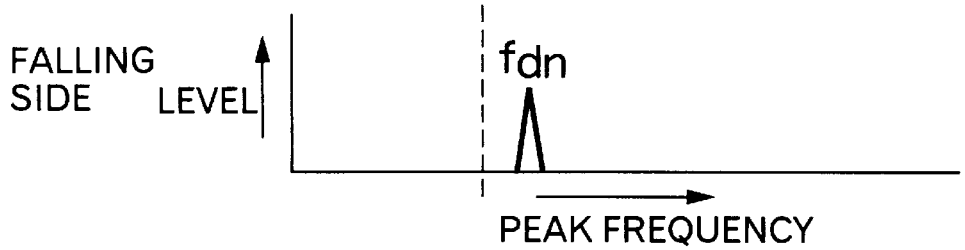

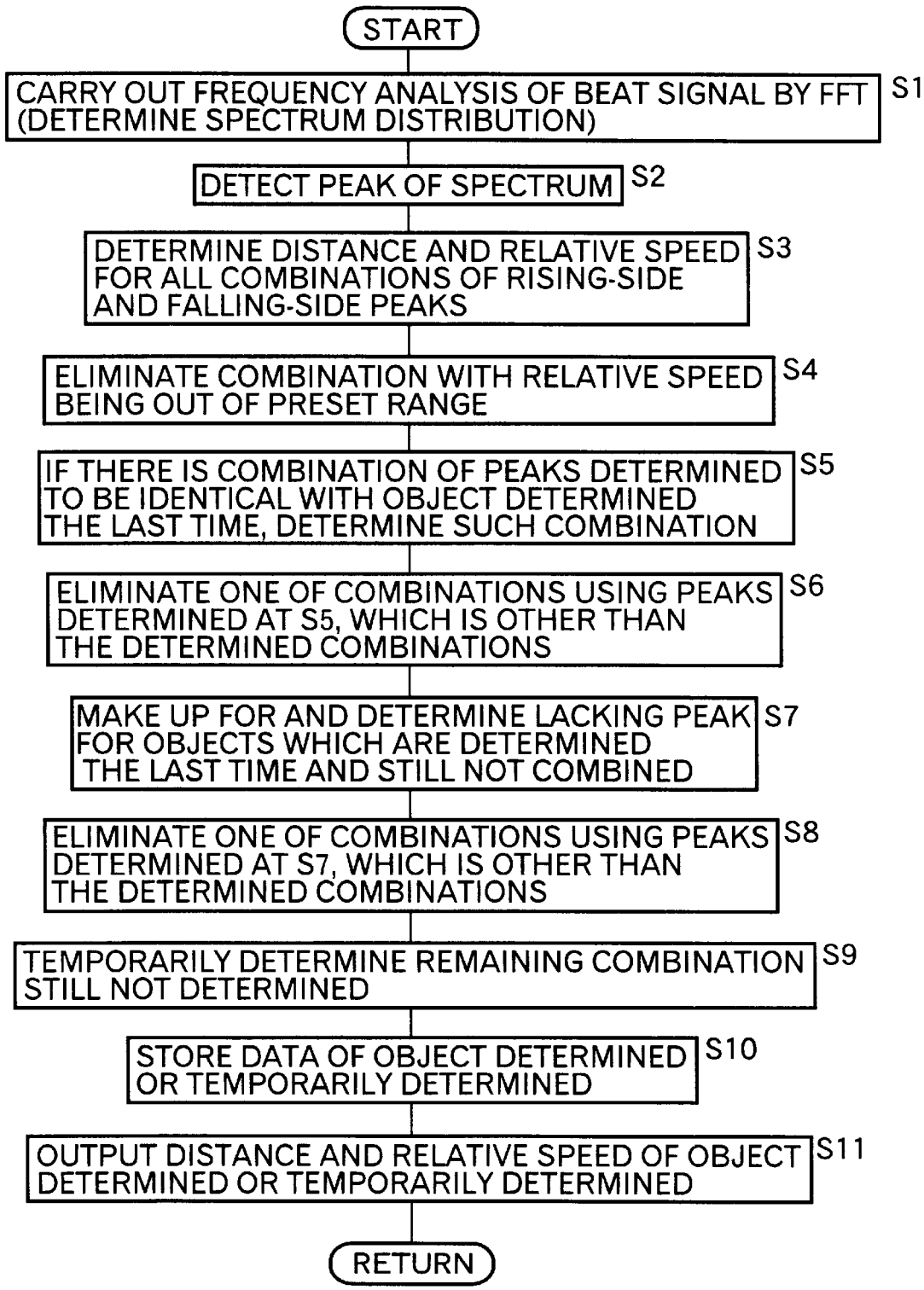

FIG. 7

|  | ▨ $fdn_1$ | ▦ $fdn_2$ | ☐ $fdn_3$ |
|---|---|---|---|
| ▨ $fup_1$ | $r_{11}, v_{11}$ | $r_{12}, v_{12}$ | $r_{13}, v_{13}$ |
| ☐ $fup_2$ | $r_{21}, v_{21}$ | $r_{22}, v_{22}$ | $r_{23}, v_{23}$ |
|  |  |  |  |

FIG. 8

|  | ▨ $fdn_1$ | ▦ $fdn_2$ | ☐ $fdn_3$ |
|---|---|---|---|
| ▨ $fup_1$ | $r_{11}, v_{11}$ | $r_{12}, v_{12}$ | ~~$r_{13}, v_{13}$~~ |
| ☐ $fup_2$ | $r_{21}, v_{21}$ | $r_{22}, v_{22}$ | $r_{23}, v_{23}$ |
|  |  |  |  |

FIG. 9

|  | ▨ $fdn_1$ | ▦ $fdn_2$ | ☐ $fdn_3$ |
|---|---|---|---|
| ▨ $fup_1$ | ($r_{11}, v_{11}$) | $r_{12}, v_{12}$ | ~~$r_{13}, v_{13}$~~ |
| ☐ $fup_2$ | $r_{21}, v_{21}$ | $r_{22}, v_{22}$ | $r_{23}, v_{23}$ |
|  |  |  |  |

FIG. 10

|  | ▨ $fdn_1$ | ▦ $fdn_2$ | ☐ $fdn_3$ |
|---|---|---|---|
| ▨ $fup_1$ | ($r_{11}, v_{11}$) | ~~$r_{12}, v_{12}$~~ | ~~$r_{13}, v_{13}$~~ |
| ☐ $fup_2$ | ~~$r_{21}, v_{21}$~~ | $r_{22}, v_{22}$ | $r_{23}, v_{23}$ |
|  |  |  |  |

FIG.11

|  | ▨ fdn$_1$ | ▦ fdn$_2$ | ☐ fdn$_3$ |
|---|---|---|---|
| ▨ fup$_1$ | (r$_{11}$,V$_{11}$) | r̶$_{12}$,V̶$_{12}$ | r̶$_{13}$,V̶$_{13}$ |
| ☐ fup$_2$ | r̶$_{21}$,V̶$_{21}$ | r$_{22}$,V$_{22}$ | r$_{23}$,V$_{23}$ |
| ▦ fup$_3$ | — | (r$_{32}$,V$_{32}$) | — |

FIG.12

|  | ▨ fdn$_1$ | ▦ fdn$_2$ | ☐ fdn$_3$ |
|---|---|---|---|
| ▨ fup$_1$ | (r$_{11}$,V$_{11}$) | r̶$_{12}$,V̶$_{12}$ | r̶$_{13}$,V̶$_{13}$ |
| ☐ fup$_2$ | r̶$_{21}$,V̶$_{21}$ | r̶$_{22}$,V̶$_{22}$ | r$_{23}$,V$_{23}$ |
| ▦ fup$_3$ | — | (r$_{32}$,V$_{32}$) | — |

FIG.13

|  | ▨ fdn$_1$ | ▦ fdn$_2$ | ☐ fdn$_3$ |
|---|---|---|---|
| ▨ fup$_1$ | (r$_{11}$,V$_{11}$) | r̶$_{12}$,V̶$_{12}$ | r̶$_{13}$,V̶$_{13}$ |
| ☐ fup$_2$ | r̶$_{21}$,V̶$_{21}$ | r̶$_{22}$,V̶$_{22}$ | (r$_{23}$,V$_{23}$) |
| ▦ fup$_3$ | — | (r$_{32}$,V$_{32}$) | — |

FIG.14

|  | DISTANCE, RELATIVE SPEED | PEAK FREQUENCY | | TYPE |
|---|---|---|---|---|
| OBJECT 1 ▨ | r$_{11}$,V$_{11}$ | fup$_1$ | fdn$_1$ | DETERMINED |
| OBJECT 2 ▦ | r$_{32}$,V$_{32}$ | fup$_3$ | fdn$_2$ | DETERMINED |
| OBJECT 3 ☐ | r$_{23}$,V$_{23}$ | fup$_2$ | fdn$_3$ | TEMPORARILY DETERMINED |

OBJECT DETECTING SYSTEM

FIELD OF THE INVENTION

The present invention relates to an object detecting system designed to be able to carry out detection of an object using an FM-CW wave.

BACKGROUND OF THE INVENTION

An object detecting system is described, for example, in "Radar Technology" (issued from Electronic Information Communication Institute, Foundation), and is arranged so that a distance from a vehicle to an object to be detected and a relative speed of the vehicle is obtained from rising-side and falling-side peak frequencies which are obtained by transmitting an FM-CW wave with its frequency increased and decreased into a triangular waveform with time in a forward direction of the vehicle. A wave reflected from the reflecting object existing ahead of the vehicle is received, the transmitted signal and the received signal are mixed with each other to provide a beat signal, and the beat signal is subjected to frequency analysis.

If a plurality of vehicles or roadside objects such as road lamps exist ahead of the subject vehicle, the plurality of vehicles and the roadside objects are simultaneously detected, thereby providing pluralities of rising-side and falling-side peak frequencies. Therefore, if the rising-side and falling-side peak frequencies are not accurately combined, the distance to the object to be detected and the relative speed of the subject vehicle cannot be accurately determined, and a mis-detection may occur.

Therefore, in a system disclosed in Japanese Patent Application Laid-open No. 8-94749, all the rising-side and falling-side peak frequencies are combined, and the distance between the object and the subject vehicle is calculated for all combinations of the rising-side and falling-side peak frequencies. The calculated distance is compared with a predicted distance based on the combinations determined the last time. Thus, the combination of the peak frequencies with the calculated distance nearest to the predicted distance is determined as a combination individually corresponding to the object.

In the system described in Japanese Patent Application Laid-open No. 8-94749, when either one of the rising-side and falling-side peak frequencies forming a pair for the object to be detected is missing due to any cause, a position predicted from the previous combination can be output directly as made-up data, if the period of time for the missing information is short. However, when the missing information is sustained for a long period of time, it is impossible to accurately combine the remaining peak frequencies without the missing information. Hence, the distance between the subject vehicle and the object and the relative speed of the subject vehicle are calculated based on the result of the combination of inappropriate peak frequencies with each other.

SUMMARY OF THE INVENTION

The present invention has been accomplished with such a circumstance in mind. It is an object of the present invention to provide an object detecting system which is designed so that even if either one of the rising-side and falling-side peak frequencies is missing, a plurality of objects can be accurately recognized by accurately combining the pluralities of rising-side and falling-side peak frequencies.

To achieve the above object, according to a first aspect and feature of the present invention, an object detecting system comprises a transmitting and receiving means for transmitting an FM-CW wave and for receiving a reflected wave of the transmitted FM-CW wave, which is reflected from an object. A mixer mixes the transmitted wave and the received wave of the transmitting and receiving means to produce a beat signal. A frequency analyzing means carries out frequency analysis of the beat signal provided in the mixer. A peak frequency detecting means determines rising-side and falling-side peak frequencies based on the result of the frequency analysis carried out by the frequency analyzing means. A calculating means calculates a distance between a subject vehicle and the object and calculating relative speed of the subject vehicle based on the rising-side and falling-side peak frequencies determined in the peak frequency detecting means. When the rising-side and falling-side peak frequencies for a plurality of objects are obtained, the calculating means also calculates a distance between the subject vehicle and each of the objects for all combinations of the rising-side and falling-side peak frequencies, and compares the calculated distance with a predicted distance based on the combinations determined the last time. Thus, the calculating means determines the combination of the peak frequencies with the calculated distance nearest to the predicted distance as a combination individually corresponding to each of the objects. The calculating means determines if either one of the rising-side and falling-side peak frequencies is missing, and when one is missing, the calculating means determines the combination of the peak frequencies by calculating the missing peak frequency based on a peak frequency which is not missing.

With the arrangement of the first feature, when it is determined that either one of the rising-side and falling-side peak frequencies is missing, the combination of the peak frequencies can be determined by determining the missing peak frequency based on the other remaining peak frequency. Thus, even if either one of the rising-side and falling-side peak frequencies is missing, the plurality of objects can be recognized more accurately by determining the combinations of the peak frequencies.

According to a second aspect and feature of the present invention, preferably, the calculating means preferentially determines the combination of the peak frequencies with the calculated distance nearest to the predicted distance, and then carries out the operation of combining the peak frequencies when either one of the rising-side and falling-side peak frequencies is missing.

Further, according to a third aspect and feature of the present invention, in addition to the arrangement of the first or second feature, the calculating means carries out the determination of combinations and excludes a combination with the calculated relative speed which assumes a value which cannot be actually produced. Thus, in determining all the combinations of the rising-side and falling-side frequencies, the combination which cannot be actually produced, can be excluded to avoid unnecessary processing, thereby shortening the calculating time.

BRIEF DESCRIPTION OF DRAWINGS

FIGS. 2A and 2B are diagrams showing the waveforms of transmitted and received waves and a peak frequency when an object is moving relative to a transmitting and receiving antenna.

FIGS. 3A and 3B are diagrams showing a peak detected by a peak detecting means.

FIG. 4 is a flow chart showing a processing procedure for a CPU.

FIG. 7 is a diagram for explaining the processing at step S3 in FIG.4.

FIG. 8 is a diagram for explaining the processing at step S4 in FIG. 4.

FIG. 9 is a diagram for explaining the processing at step S5 in FIG. 4.

FIG. 10 is a diagram for explaining the processing at step S6 in FIG. 4.

FIG. 11 is a diagram for explaining the processing at step S7 in FIG. 4.

FIG. 12 is a diagram for explaining the processing at step S8 in FIG. 4.

FIG. 13 is a diagram for explaining the processing at step S9 in FIG. 4.

FIG. 14 is a diagram for explaining the processing at step S10 in FIG. 4.

DESCRIPTION OF THE PREFERRED EMBODIMENTS

The mode for carrying out the present invention will now be described by way of an embodiment shown in the accompanying drawings.

The terms "object" and "virtual object" used in the description of the embodiment are defined as follows:
Object: indicates an actual object or matter.
Virtual Object: indicates a distance and relative speed data provided by combining a rising peak frequency and a falling peak frequency with each other. Therefore, a plurality of virtual objects may be obtained from a single object.

Figure 1:
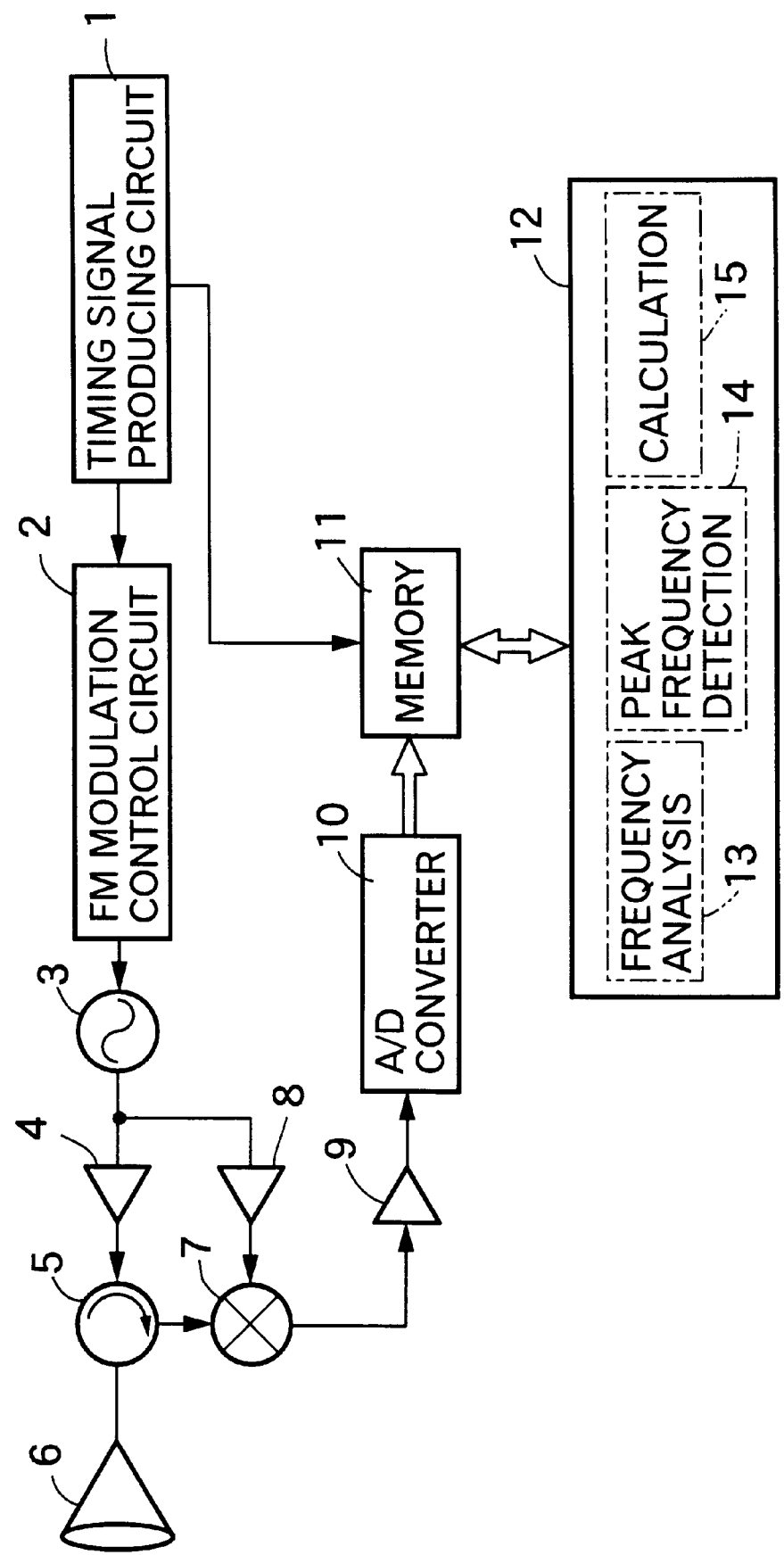
FIG. 1 is a block diagram showing the arrangement of an object detecting system.
Figure 5A:
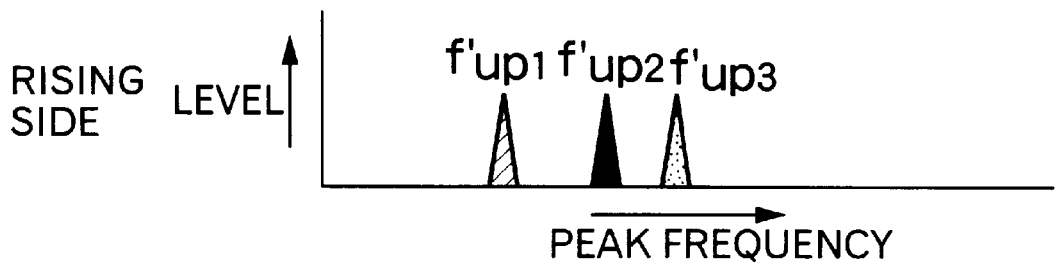
FIGS. 5A and 5B are diagrams showing examples of peaks determined thee time.
Figure 5B:
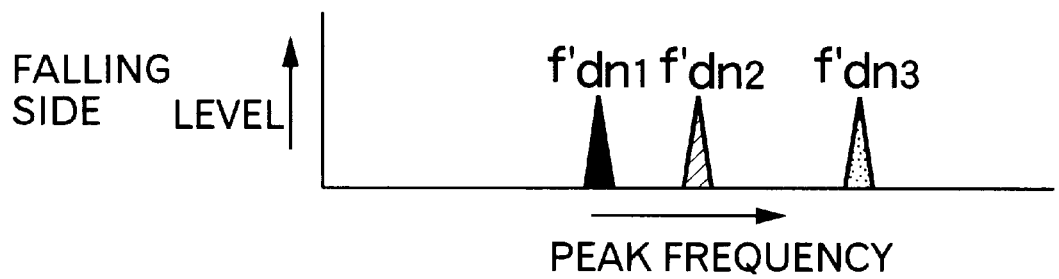
Figure 6A:
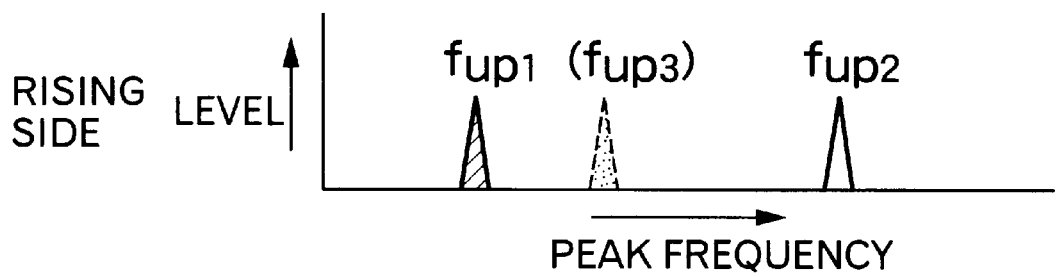
FIGS. 6A and 6B are diagrams showing examples of peaks provided this time.
Figure 6B:
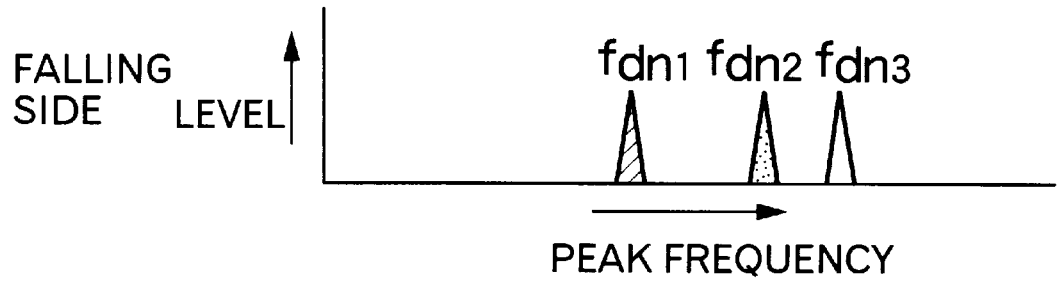

FIGS. 1 to 14 show an embodiment of the present invention. FIG. 1 is a block diagram showing the arrangement of an object detecting system; FIGS. 2A and 2B are diagrams showing the waveforms of transmitted and received waves and a peak frequency when an object is moving relative to a transmitting and receiving antenna; FIG. 3 is a diagram showing a peak detected by a peak detecting means; FIG. 4 is a flow chart showing a processing procedure for a CPU; FIGS. 5A and 5B are diagrams showing examples of peaks determined the last time; FIGS. 6A and 6B are diagrams showing examples of peaks provided this time; FIG. 7 is a diagram for explaining the processing at step S3 in FIG. 4; FIG. 8 is a diagram for explaining the processing at step S4 in FIG. 4; FIG. 9 is a diagram for explaining the processing at step S5 in FIG. 4; FIG. 10 is a diagram for explaining the processing at step S6 in FIG. 4; FIG. 11 is a diagram for explaining the processing at step S7 in FIG. 4; FIG. 12 is a diagram for explaining the processing at step S8 in FIG. 4; FIG. 13 is a diagram for explaining the processing at step S9 in FIG. 4; FIG. 14 is a diagram for explaining the processing at step S10 in FIG. 4.

Referring first to FIG. 1, the oscillating operation of an oscillator 3 is controlled in modulation by an FM modulation control circuit 2 based on a timing signal input from a timing signal generating circuit 1, whereby the frequency is modulated into a triangular waveform as shown by a solid line in FIG. 2A. The transmitted and modulated signal from the oscillator 3 is input to a transmitting and receiving antenna 6, as a transmitting and receiving means, through an amplifier 4 and a circulator 5. An FM-CW wave is transmitted from the transmitting and receiving antenna 6. If an object such as a vehicle traveling ahead of a subject vehicle (which will be referred to as a preceding vehicle hereinafter) exists ahead of the transmitting and receiving antenna 6, a wave reflected from the object is received by the transmitting and receiving antenna 6. For example, when an object ahead of the subject vehicle is approaching the subject vehicle, this reflected wave appears as shown by a dashed line in FIG. 2A. On a rising side in which the transmitted wave rectilinearly increases, the reflected wave appears at a lower frequency and behind the transmitted wave. On a falling side in which the transmitted wave rectilinearly decreases, the reflected wave appears at a higher frequency and behind the transmitted wave.

The wave received in the transmitting and receiving antenna 6 is input to a mixer 7 through the circulator 5. A transmitted signal, which is distributed from a transmitted signal output from the oscillator 3, has also been input to the mixer 7 through the amplifier 8 in addition to the received wave from the circulator 5. In the mixer 7 by mixing of the transmitted wave and the received wave with each other, a beat signal is generated having a peak frequency $f_{up}$ on the rising side in which the transmitted wave rectilinearly increases and a peak frequency $f_{dn}$ on the falling side in which the transmitted wave rectilinearly decreases, as shown in FIG. 2B.

The beat signal provided in the mixer 7 is amplified to an amplitude of a level required in the amplifier 9 and is then A/D-converted at every sampling time by an A/D converter 10. Amplified data thus digitalized is stored and retained in a time-series manner in a memory 11. The timing signal is input to the memory 11 from the timing signal generating circuit 1, and the memory 11 stores and retains data in accordance with the timing signal for each of a rising side in which the frequency of the transmitted and received wave increases and a falling side in which the frequency decreases.

The data retained in the memory 11 is input to CPU 12, where a calculation based on the input data is carried out. The CPU 12 includes a frequency analyzing means 13, a peak frequency detecting means 14, and a calculating means 15.

The frequency analyzing means 13 carries out a frequency analysis of the data of the beat signal, which is stored and retained in the memory 11, to provide a spectral distribution. One technique for the frequency analysis which may be used is FFT (a fast Fourier transform).

The peak frequency detecting means 14 detects a spectrum (a peak spectrum) which assumes a maximum value at a spectrum level equal to or larger than a predetermined threshold value, based on spectrum data obtained by the frequency analysis in the frequency analyzing means 13. In this detection, it is determined that the detected spectrum is a peak spectrum, for example, when a spectrum level which is equal to or larger than the predetermined threshold value is detected. This spectrum has a frequency level around the detected spectrum level which is inverted from an increasing tendency to a decreasing tendency. A rising-side peak spectrum shown in FIG. 3A and a falling-side peak spectrum shown in FIG. 3B are detected by the peak frequency detecting means 14 in such a manner that an equidistance peak, when the relative speed of the subject vehicle relative to an object is "0", is interposed between these peak spectra.

The calculating means 15 calculates a distance between the subject vehicle and an object and calculates a relative speed of the subject vehicle relative to the object based on the rising-side and falling-side peak frequencies $f_{up}$ and $f_{dn}$ obtained in the peak frequency detecting means 14. When rising-side and falling-side peak frequencies $f_{up}$ and $f_{dn}$ are obtained in the peak frequency detecting means 14 for a plurality of objects, the calculating means 15 carries out a process for determining a combination of the rising-side and falling-side peak frequencies $f_{up}$ and $f_{dn}$, and calculates the distance and the relative speed for the object having the peak frequencies $f_{up}$ and $f_{dn}$ of the finally determined combination.

Here, the rising-side peak frequency $f_{up}$ and the falling-side peak frequency $f_{dn}$ of the transmitted wave are represented by the following first and second equations (1) and (2):

$$f_{up}=(4\cdot\Delta f\cdot r)/(c\cdot T_m)+\{(2\cdot f_0)/c\}\cdot v \tag{1}$$

$$f_{up}=(4\cdot\Delta f\cdot r)/(c\cdot T_m)-\{(2\cdot f_0)/c\}\cdot v \tag{2}$$

wherein $f$ is a modulation depth; c is a speed of light; $T_m$ is a period of repetition of modulation; r is a distance to the object, $f_0$ is a transmitted center frequency; and v is a relative speed relative to the object.

If, based on the first and second equations (1) and (2), the distance r to the object and the relative speed v are calculated according to the following third and fourth equations (3) and (4):

$$r=(c\cdot T_m)\cdot(f_{up}+f_{dn})/(8\cdot\Delta f) \tag{3}$$

$$v=(c\cdot((f_{up}-f_{dn}))/(4\cdot f_0) \tag{4}$$

Namely, the distance r and the relative speed v are provided based on the rising-side peak frequency $f_{up}$ and the falling-side peak frequency $f_{dn}$.

In the CPU 12 including the frequency analyzing means 13, the peak frequency detecting means 14 and the calculating means 15, the distance between the subject vehicle and the object and the relative speed of the subject vehicle are calculated according to a procedure shown in FIG. 4. The calculation by the calculating means 15 is carried out at or after step S3, after frequency analysis by the frequency analyzing means 13 is carried out at step S1 as well as after the detection of the peak frequency by the peak frequency detecting means 14 at step S2.

At step S3, the distance between the object and the subject vehicle and the relative speed of the subject vehicle are calculated for all combinations of the rising-side and falling-side peak frequencies $f_{up}$ and $f_{dn}$ detected by the peak frequency detecting means 14.

Here, for the purpose of facilitating the description, the following case is assumed: as shown in FIG. 5, three rising-side peak frequencies $f'_{up1}$, $f'_{up2}$ and $f'_{up3}$ and three falling-side frequencies $f'_{dn1}$, $f'_{dn2}$ and $f'_{dn3}$ have been obtained the last time in combinations determined by correspondence of ones of the same pattern. When the distance and the relative speed have been determined as $R_1$ and $V_1$ respectively for the object in the combination of $f'_{up1}$ and $f'_{dn2}$; the distance and the relative speed have been determined as $R_2$ and $V_2$ respectively for the object in the combination of $f'_{up2}$ and $f'_{dn1}$; and the distance and the relative speed have been determined as $R_3$ and $V_3$ respectively for the object in the combination of $f'_{up3}$ and $f'_{dn3}$, three peak frequencies $f'_{dn1}$, $f'_{dn2}$ and $f'_{dn3}$ are obtained this time on the falling side, whereas only two peak frequencies $f'_{up1}$ and $f'_{up2}$ are obtained on the rising side with a single peak frequency missing, as shown in FIG. 6.

Under such a circumstance, a table is made with combinations of all of the frequencies, i.e., the three falling-side peak frequencies $f_{dn1}$, $f_{dn2}$ and $f_{dn3}$ and the two rising-side peak frequencies $f_{up1}$ and $f_{up2}$, as shown in FIG. 7, and the distance r and the relative speed v are calculated for every combination at step S3.

At step S4, in the table made at step S3, a determination of the combinations is carried out, excluding the combination in which the relative speed, which cannot be actually produced, has been obtained. Here, the relative speed which cannot be actually produced is set, for example, at±200 km/hr. For example, when the relative speed $V_{13}$ obtained from the combination of the falling-side peak frequency $f_{dn3}$ with the rising-side frequency $f_{up1}$ is a value outside of a preset range, the combination of the frequencies $f_{dn3}$ and $f_{up1}$ is eliminated as shown by X in FIG. 8.

At step S5, if there is a combination of peaks which is identical with the combination of peaks determined the last time, such a combination is determined. Here, in determining whether the combination of peaks is identical with the combination of peaks determined the last time, it is determined that a virtual object having a distance closest to the predicted distance of a virtual object determined the last time as shown in FIG. 5. The predicted distance is obtained as $(R_1+V_1 \, t_s)$ for the combination $f'_{up1}$ and $f'_{dn2}$ determined the last time, wherein $t_s$ is a time of the processing period; the predicted distance is obtained as $(R_2+V_2 \, t_s)$ for the combination $f'_{up2}$ and $f'_{dn1}$ determined the last time; and the predicted distance is obtained as $(R_3+V_3 \, t_s)$ for the combination $f'_{up3}$ and $f'_{dn3}$ determined the last time. Therefore, it is determined that the combinations with the distance r calculated in a range of the predicted distance±are identical. For example, if $(R_1+V_1 t_s-) \, r_{11} \, (R_1+V_1 \, t_s+)$, it is determined that the combination of $f_{up1}$ and $f_{dn1}$ is identical with the combination of $f'_{up1}$ and $f'_{dn2}$ determined the last time, and is shown as surrounded by a solid line in FIG. 9.

At step S6, those of the combinations using the peaks determined at step S5 which are other than the determined combinations are excluded. Namely, when the combination of $f_{up1}$ and $f_{dn1}$ has been determined at step S5, the combination of $f_{up1}$ and $f_{dn2}$ and the combination of $f_{up2}$ and $f_{dn1}$ are eliminated, as shown by the Xs in FIG. 10.

At step S7, a missing peak for virtual objects determined the last time and still not combined this time is made up and determined. Namely, the rising-side peak frequency $f_{up3}$ corresponding to the falling-side peak frequency $f_{dn2}$ is missing, but if it can be construed that such a virtual object is still continued even this time, the missing peak is made up or assumed. In this case, in determining whether there is a left peak, the current peak frequency is predicted from the relative speed of the virtual object determined the last time, and if the peak frequency is left within a given range from the predicted frequency, it is determined that there is a left peak. If it is determined that the falling-side peak frequency $f_{dn2}$ is identical with that for the virtual object with the last combination of $f'_{up3}$ and $f'_{dn3}$, $r_{32}=R_3+V_3 \, t_s$ and $v_{32}=V_3$ are defined, as shown in FIG. 11, and the missing peak frequency $f_{up3}$ is reversely calculated from the equations (3) and (4).

At step S8, those or one of the combinations using the peaks determined at step S7, which are or is other than the determined combinations, are eliminated. Namely, if the combination of $f_{up3}$ and $f_{dn2}$ has been determined at step S7, the combination of $f_{up2}$ and $f_{dn2}$ is eliminated as shown by the Xs in FIG. 12.

At step S9, the remaining and still undetermined combination is temporarily determined. The remaining combination of $f_{up2}$ and $f_{dn3}$ is temporarily determined as surrounded by a dashed line in FIG. 13, and the distance $r_{23}$ and the relative speed in the temporarily determined combination of $f_{up2}$ and $f_{dn2}$ are not used for the determination and presumption at the next processing. However, if the temporarily determined combinations appear continuously a preset number of times, such temporarily determined combinations are determined.

At step S10, the distance and the relative speed as well as the rising-side and falling-side peak frequencies are stored as shown in FIG. 14 for the virtual object determined or temporarily determined not later than step S9. The stored data are used for determining the number of continuous times of determination and presumption or temporary determination of the combination at the next processing. Further, the distance and the relative speed for the determined or temporarily determined virtual object are output at step S11.

When a plurality of rising-side and falling-side peak frequencies are detected by the peak frequency detecting means 14 in the above manner, the calculating means 15 calculates a distance between the subject vehicle and each of the objects for all of the combinations of the rising-side and falling-side peak frequencies, and compares the calculated distance with a predicted distance based on the combination determined the last time, thereby determining the combination of the peak frequencies with the calculated distance nearest to the predicted distance as a combination individually corresponding to each of the objects. In this manner, the plurality of objects can be discriminated. In this case, when either one of the rising-side and falling-side peak frequencies is missing, the combination of the peak frequencies is determined by calculating the missing peak frequency based on the non-missing peak frequency. Therefore, even if either one of the rising-side and falling-side peak frequencies is missing, the combination of the peak frequencies can be reliably determined and thus, the plurality of objects can be accurately recognized.

The calculating means 15 carries out the determination of the combinations of the rising-side and falling-side peak frequencies, and excludes one of all the combinations in which the relative speed is incapable of being actually produced. Therefore, in carrying out the determination of all the combinations of the rising-side and falling-side peak frequencies, the combination which cannot be actually produced can be eliminated to avoid wasteful unnecessary processing, thereby shortening the calculating time.

The transmitting and receiving means may be comprised of a transmitting antenna and a receiving antenna.

As discussed above, according to first and second aspects of the present invention, when either one of the rising-side and falling-side frequencies is missing, the combination of the peak frequencies is determined by determining the missing peak frequency based on the remaining peak frequency. Thus, even if either one of the rising-side and falling-side frequencies is missing, the plurality of objects can be recognized more accurately by determining the combinations of the peak frequencies.

According to a third aspect of the present invention, in carrying out the determination of all the combinations of the rising-side and falling-side peak frequencies, a combination which is incapable of being actually produced can be eliminated to avoid unnecessary processing, thereby shortening the calculating time.

Although the embodiment of the present invention has been described in detail, it will be understood that the present invention is not limited to the above-described embodiment, and various modifications may be made without departing from the spirit and scope of the subject matter of the present invention.

What is claimed is:

1. An object detecting system comprising:

a transmitting and receiving means for transmitting an FM-CW wave and for receiving a reflected wave of the transmitted FM-CW wave, which is reflected from an object;

a mixer means for mixing the transmitted wave and the received wave of said transmitting and receiving means to produce a beat signal;

a frequency analyzing means for frequency analyzing the beat signal provided in said mixer means;

a peak frequency detecting means for determining rising-side and falling-side peak frequencies based on a result of frequency analysis by said frequency analyzing means; and a calculating means for calculating a distance between a subject vehicle and the object and for calculating a relative speed of the subject vehicle based on the rising-side and falling-side peak frequencies determined in said peak frequency detecting means, wherein when the rising-side and falling-side peak frequencies for a plurality of objects are obtained, said calculating means for calculating a distance between the subject vehicle and each of the objects for all combinations of the rising-side and falling-side peak frequencies, and for comparing said calculated distance with a predicted distance based on the combinations determined a last time, therein determining the combination of the peak frequencies with the calculated distance nearest to the predicted distance as a combination individually corresponding to each of said objects, wherein said calculating means for determining if either one of the rising-side and falling-side peak frequencies is missing, and when one is missing, said calculating means for determining the combination of the peak frequencies by calculating said missing peak frequency based on peak frequencies which are not missing.

2. An object detecting system according to claim 1, wherein said calculating means for preferentially determining the combination of the peak frequencies with the calculated distance nearest to the predicted distance, and then for carrying out the operation of combining the peak frequencies when either one of the rising-side and falling-side peak frequencies is missing.

3. An object detecting system according to claim 1, wherein said calculating means for carrying out the determination of combinations, excluding a combination in which the calculated relative speed assumes a value which cannot be actually produced.

4. An object detecting system according to claim 2, wherein said calculating means for carrying out the determination of combinations, excluding a combination in which the calculated relative speed assumes a value which cannot be actually produced.

* * * * *